No. 886,082. PATENTED APR. 28, 1908.
R. H. SIMPSON & W. PARK.
POWER DRIVEN VEHICLE.
APPLICATION FILED DEC. 31, 1907.
2 SHEETS—SHEET 1.
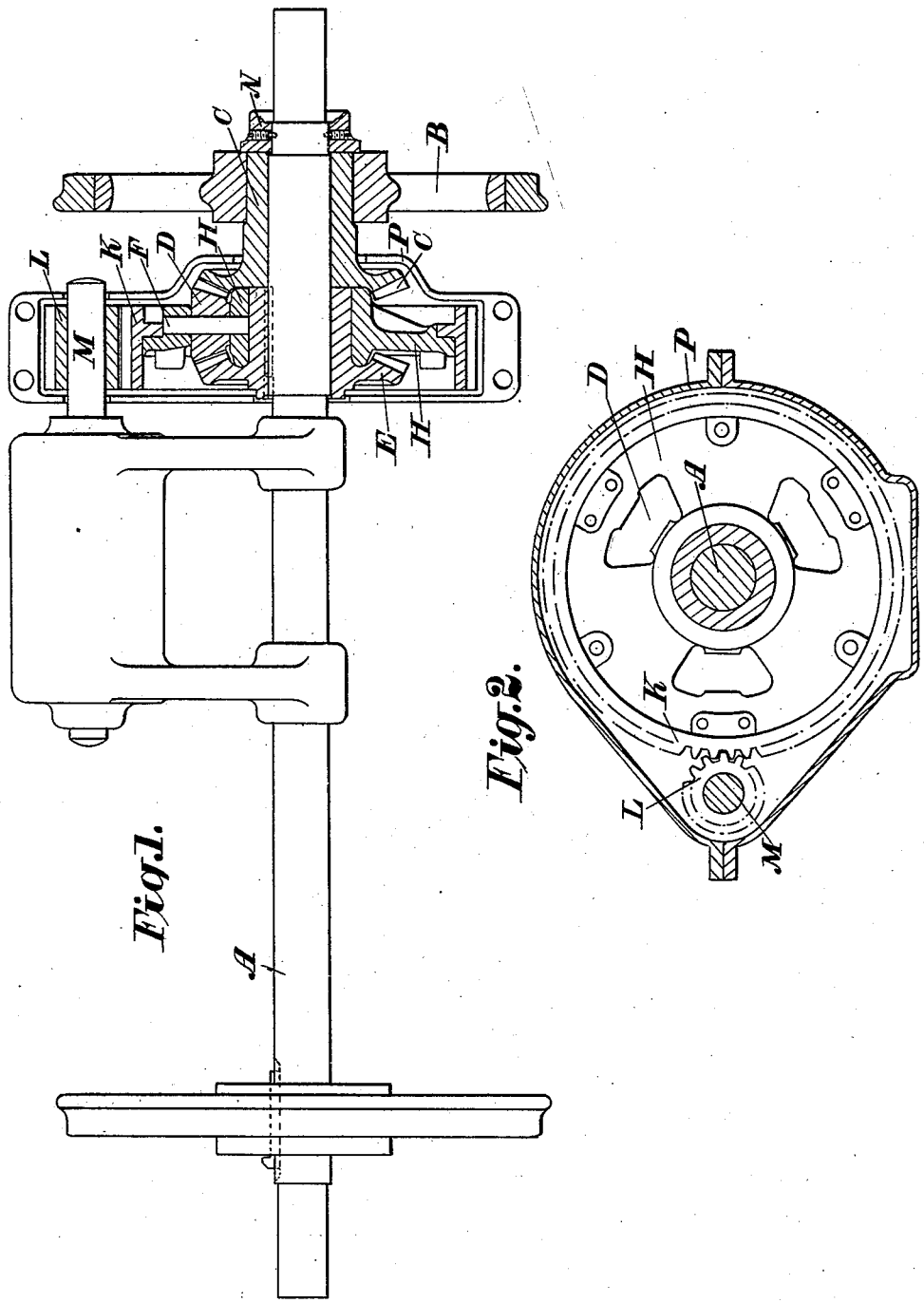

No. 886,082. PATENTED APR. 28, 1908.
R. H. SIMPSON & W. PARK.
POWER DRIVEN VEHICLE.
APPLICATION FILED DEC. 31, 1907.
2 SHEETS—SHEET 2.
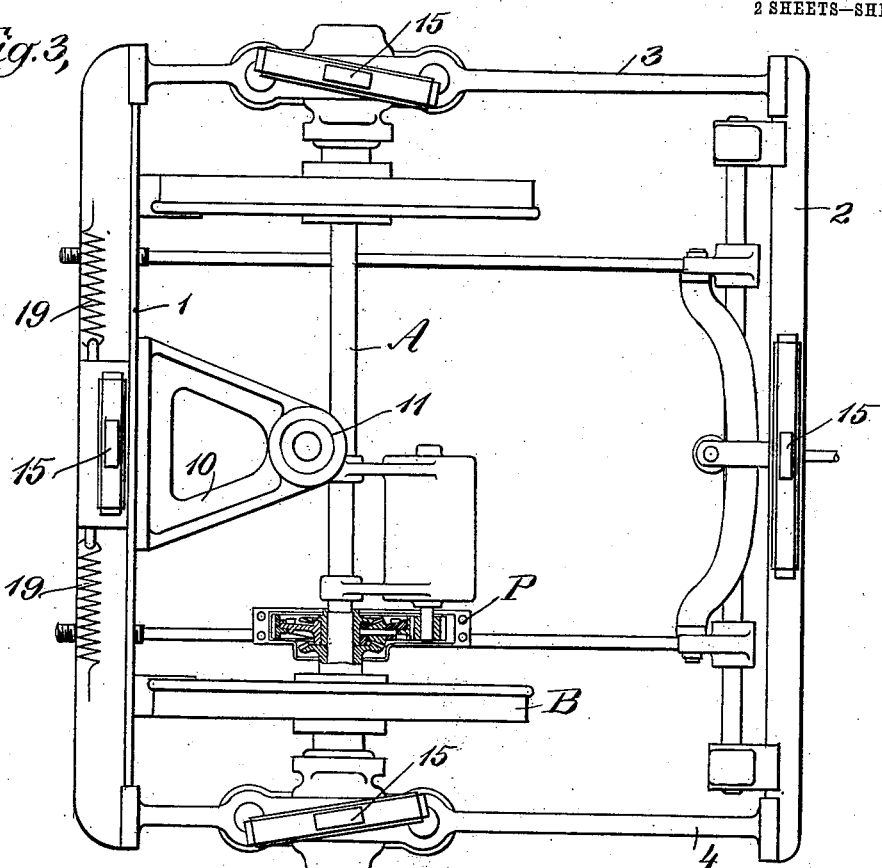
Fig.3,
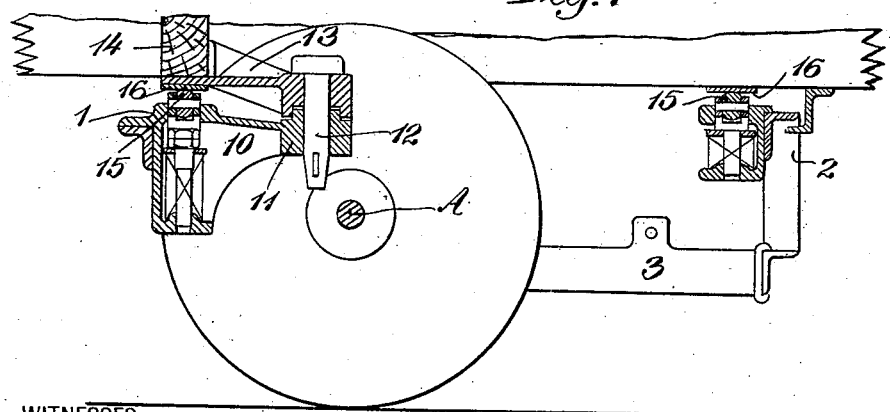
Fig.4
WITNESSES: INVENTORS:

UNITED STATES PATENT OFFICE.

ROBERT HERBERT SIMPSON AND WILLIAM PARK, OF RUGBY, ENGLAND.

POWER-DRIVEN VEHICLE.

No. 886,082.  Specification of Letters Patent.  Patented April 28, 1908.

Application filed December 31, 1907. Serial No. 409,372.

*To all whom it may concern:*

Be it known that we, ROBERT HERBERT SIMPSON and WILLIAM PARK, both subjects of the King of Great Britain, residing at Rugby, England, have invented certain new and useful Improvements in and Relating to Power-Driven Vehicles.

Our invention relates to motor driven vehicles such as electrically driven tramway cars of the bogie truck type such as referred to in our Patent No. 19714 of 1904 having only one axle to each bogie said axle being adapted to radiate or move angularly relatively to the car body for the purpose of enabling the vehicle to travel round curves easily.

In electric tramway cars of the type in which the weight of the cars and propelling motors is supported on two pairs of wheels mounted on two axles, it has been necessary in order to enable the car to travel round sharp curves to place the axles comparatively close together, that is, to employ a short wheel base. This construction has the disadvantage among others that when the car is accelerating or when traveling even at comparatively low speeds it is liable to assume a pitching motion, which strains the structure and causes discomfort to the passengers. Trucks of this type have the further disadvantage that the friction of the wheel flanges on the rails in passing round curves is excessive, thus causing the wheels and rails to wear away quickly and necessitating comparatively frequent renewal. In order to overcome these and other objections the so-called "bogie" type of truck has been developed; according to which construction a separate truck frame is provided at or near the end of the car, each frame having two axles and two pairs of wheels and pivoting about a vertical axis so as to render it possible for the axles to become displaced relative to the car-body and allow the car to take curves easily. This type of truck has on the whole been found to be very successful in practice, but has the disadvantage of being somewhat costly and also in cases where all the wheels are not used for propelling the vehicle, of preventing the obtaining of sufficient adhesion between the wheels and the rails for mounting heavy grades.

In our British Patent No. 19,714 of 1904, above referred to, we have disclosed a structure for overcoming the above mentioned objections, in which we use for each vehicle two "bogie" trucks, each of which has only one axle which is capable of swiveling relative to the car-body, thus obviating the disadvantages of the first mentioned type of truck having fixed axles, and enabling the greater adhesion between the wheels and the rails to be obtained which this type of truck affords.

We have found that when a car of this type is approaching a curve from a straight track, the tendency of the axles is not to turn into a radial position and that this defect appears to be owing to the fact that both the car wheels are rigidly connected to the axle so that unless slipping occurs between the wheels and the rails, the axle cannot come into the radial position.

The object of our invention is to overcome this difficulty and to this end it consists in providing the power-driven axle with a differential gear which will allow the action of the two wheels to be independent of each other.

In the accompanying drawings which illustrate our invention as applied to a radiating axle for an electrically propelled vehicle, Figure 1 is a plan view of a vehicle axle showing the differential gear and one of the wheels in section. Fig. 2 is a part end view of the same the bevel wheels being omitted for the sake of clearness. Fig. 3 is a plan view of one of the trucks equipped with our improvements, and Fig. 4 is a longitudinal-vertical section through the pivot axis of the truck.

Referring to Figs. 3 and 4, the truck is composed of a frame which is rectangular in plan and comprising a pair of end members 1 and 2, which are united by side frames 3 and 4. The end member 1 is fitted with a bracket 10 projecting towards the axle and this bracket is formed with a pivot socket 11 for a king-pin 12 projecting downwardly from a bracket 13 carried by the car under frame 14, as shown more clearly in Fig. 4. The king-pin 12 round the axis of which the truck swivels may be placed in front of the axle as shown, or directly over the center of the axle.

In order to prevent the truck from swiveling too easily and to maintain it normally with its axle at right angles to the rails buffer springs 19 are provided between the under frame 14 and truck frame or in other suitable position. These springs may be arranged as either tension or compression springs and are of sufficient strength to keep the axle normally at right angles to the rails, but not too stiff to prevent radiating of the axle when the car is passing round curves.

In carrying our invention into effect as illustrated in the drawings we connect one of the vehicle wheels rigidly to the axle A while the other wheel B is mounted so as to be capable of rotation relatively thereto. This wheel B is securely mounted on the extended hub of a bevel wheel C which latter is revolubly mounted on axle A. The bevel wheel C gears with three or more bevel pinions D. Gearing with these pinions at the opposite side is another bevel wheel E which is securely fixed on the axle A. The bevel pinions D are revolubly mounted on pins F which are carried on a spider or disk H. This spider or disk carries on its outer periphery a renewable toothed ring K preferably made in two halves bolted to center H. The complete spider or disk H carrying the pinions D and toothed ring K is revolubly mounted on extended hub of the bevel wheel E. A pinion L on the shaft M of an electric motor, gears with toothed ring K, thus driving the car wheels through the differential gear. Lateral movement of the wheel B when mounted on the hub of the bevel wheel C, is prevented by hub of the bevel wheel E securely fixed to the axle A on the one side and by a thrust collar N securely fixed to the axle A at the other side.

A gear case P incloses the whole of the gearing for the purpose of excluding dust and permitting efficient lubrication. With this arrangement, so long as the vehicle is traveling in a straight track, the axle and the loose car wheel revolve at the same speed, power being transmitted from the electric motor shaft through the spider or disk which carries the intermediate members of the differential gear, these members then being stationary on their axes and the whole gear rotating as if the members were locked. When, however, the vehicle approaches a curve, the wheels tend to run at different speeds; the bevel wheel E attached to the car axle A and the bevel wheel C attached to the car wheel B therefore run at different speeds with the result that the intermediate pinions D rotate on their axes F to allow for the difference of speed.

With the arrangement above described it will be possible for a car to take curves at a much higher speed than hitherto and also to reduce the amount of wear on the wheel tires and rail flanges which has hitherto occurred.

What we claim as new and desire to secure by Letters Patent of the United States is:—

1. A railway vehicle having an axle connected thereto by a swivel connection, to enable the axle to assume a radial position with respect to the curvature of the rails, in combination with differential gearing between the axle and wheels, whereby the wheel on the outer side of the curve may run faster than the wheel on the inner side of the curve and radiation is assisted; substantially as described.

2. A railway vehicle having a single-axle "bogie" truck connected thereto by a swivel connection to enable the axle to assume a radial position with respect to the curvature of the rails, and mechanism for normally centering the "bogie" truck with respect to the car body, in combination with differential gearing between the axle and wheels, whereby the wheel on the outer side of the curve may run faster than the wheel on the inner side of the curve and radiation is assisted, substantially as described.

In witness whereof, we have hereunto set our hands this twentieth day of December 1907.

ROBERT HERBERT SIMPSON.
WILLIAM PARK.

Witnesses:
HAROLD P. BURDEKIN,
LIZZIE BURDEKIN.